United States Patent [19]

Kitsnik

[11] 4,143,673

[45] Mar. 13, 1979

[54] PRESSURE REGULATOR

[75] Inventor: Henrik M. Kitsnik, Segmon, Sweden

[73] Assignee: AB Kalle-Regulatorer, Sweden

[21] Appl. No.: 695,981

[22] Filed: Jun. 14, 1976

[30] Foreign Application Priority Data

Jun. 17, 1975 [SE] Sweden .................. 7506937

[51] Int. Cl.² .................................... G05D 11/00
[52] U.S. Cl. ......................... 137/115; 137/510
[58] Field of Search ................ 137/115, 116, 510; 251/335 A; 92/168

[56] References Cited

U.S. PATENT DOCUMENTS

| 160,956 | 3/1875 | Reynolds | 137/115 |
|---|---|---|---|
| 615,812 | 12/1898 | Dallett | 137/115 |
| 845,402 | 2/1907 | Fracfort | 137/116 |
| 904,984 | 11/1908 | Ofeldt | 137/115 |
| 930,635 | 8/1909 | Warter | 251/335 A |
| 1,211,599 | 1/1917 | Lalor | 137/115 |
| 1,780,782 | 11/1930 | Holmes | 137/116 |
| 1,871,535 | 8/1932 | Lattner | 137/116 |
| 1,998,223 | 4/1935 | Czarnecki | 137/115 |
| 2,329,323 | 9/1943 | Benz | 137/510 |
| 2,622,610 | 12/1952 | Rowe et al. | 137/510 |
| 3,662,774 | 5/1972 | Johannisson | 137/115 |
| 3,695,149 | 10/1972 | Eberhart | 92/168 |

*Primary Examiner*—Martin P. Schwadron
*Assistant Examiner*—H. Jay Spiegel
*Attorney, Agent, or Firm*—Ostrolenk, Faber, Gerb & Soffen

[57] ABSTRACT

A pressure regulator in which inlet pressure from a pressure medium is regulated by movable control means which occupies a position representative of a balanced condition between a predetermined force applied to the control means and representative of the desired pressure, and a counter force applied through the control means to the primary force application means whereupon the control means allows a part or all of the pressure medium to reach the pressure regulator outlet and whereby the remaining portion or none of the inlet pressure is bypassed through a bypass outlet.

The desired pressure level at the outlet of the regulator may be altered by varying the force applied to the control means, typically through the use of weights of varying magnitude.

8 Claims, 5 Drawing Figures

PRESSURE REGULATOR

BACKGROUND OF THE INVENTION

This invention relates to a pressure regulator for keeping a predetermined medium pressure at a preferred, constant value, said medium pressure being controlled in dependence on a constant weight load.

In keeping a predetermined medium pressure or secondary pressure at a constant value, pressure regulators up to now usually have been used in which a spring force provides for keeping the pressure of the output flow at a constant value. Pressure regulators using this known technique have proved to have certain drawbacks. At step changes in a input medium or primary pressure of the regulator a constant pressure of the secondary flow has not been obtained owing to the proportionality of the spring but said pressure has increased or decreased depending on how the pressure of the supplied medium has varied. At different outputs of secondary flow, it has also been proved that the pressure of the latter has varied dependent on how large the output has been.

BRIEF DESCRIPTION OF THE INVENTION

The disadvantages of such known pressure regulators are overcome by the present invention which has the object of providing a pressure regulator of the type set forth above, wherein a movable means is provided in the housing of the pressure regulator, said movable means comprises a pressure area acting against the controlled medium pressure and throttle means fixed to the movable means for adjusting the amount of closure of an overflow opening.

The present invention provides a pressure regulator which in a remarkable way fulfills the object, but is at the same time still simple and cheap to construct. Further, it is very much reliable in service and is characterized by high level of accuracy and repeatability in varying primary pressure as well as in different secondary flow output as far as to a zero flow. The reliability in service depends, among other things, on the fact that the regulator has only one movable part, which floats on the controlled medium while maintaining a constant secondary pressure without any mechanical contact between the controlling elements of the variable throttle means. Owing to this, the risk that the variable throttle means may get stuck or changes its friction which results in a changing of the secondary pressure, are eliminated. The construction according to the invention is further especially adapted for operation in severe industrial surroundings, which among other things, can be seen derive from the fact that the regulator is comprised of simple and robust components which are few in number. Solid particles and defilements which enter the regulator either through the inlet or through the secondary pressure outlet are effectively removed to the overflow opening owing to its self-regulating function, said opening, in case of need, having a capability of handling a large capacity flow.

In practice it has been shown that the regulator according to the invention has excellent dynamic characteristics (quick response to step changes); an almost negligible error of proportionality and above all a very good long term stability of a determined set-point.

BRIEF DESCRIPTION OF THE FIGURES

The invention will now be described by way of example only with particular reference to the accompanying drawings wherein.

DETAILED DESCRIPTION OF THE INVENTION

Figure 1:
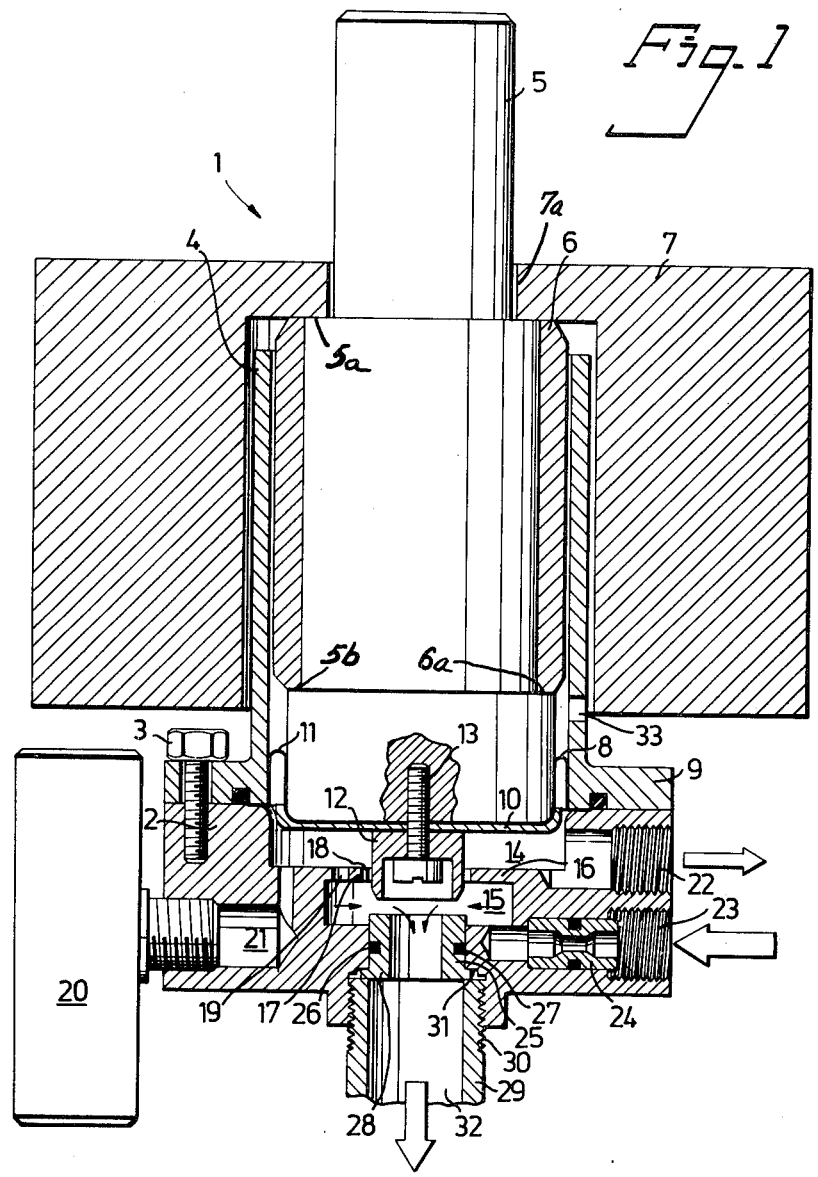
FIG. 1 shows diagrammatically a vertical section through the regulator according to the invention.

The pressure regulator 1 illustrated in FIG. 1 comprises a regulator housing 2, to which upper part a cylinder 4 is fixed by threaded fasteners 3. The cylinder 4 is open at its upper end 4a, in which end a piston 5 is inserted into the cylinder 4. The piston 5 is in this embodiment provided with two steps or shoulders 5a and 5b, one of which has a larger diameter and supports the lower end 6a of a bushing 6 made for example of Teflon, in order to ensure a minimum friction between the piston 5 and the cylinder 4. One or several weights 7 constituting the constant weight load has an upper opening 7a of reduced diameter resting against the other step 5a which is situated above the first step 5b and has somewhat smaller diameter. A rolling diaphragm 8 is mounted between a bottom flange 9 of the cylinder 4 and the housing 2 forming a seal against the controlled medium. A backing plate 10 rests against the lower side of the diaphragm 8 and the piston 5 rests against the upper side of the diaphragm 8. A pressure area is formed by the diaphragm 8, which in its turn is supported by the lower side of the piston 5 and the backing plate 10. Owing to a loop 11 of the diaphragm 8, the piston 5 can be displaced in the cylinder 4 without actuating any irrelevant forces and maintenance of a seal against the interior of the regulator 1. A regulating piston 12 is fixed by a screw 13 to the lower end of the piston 5 and rests against the backing plate 10.

The interior of the regulator is primarily comprised of two chambers, namely an upper chamber 14 and a lower chamber 15. The lower chamber 15 is separated from the upper 14 by a partition 16, in which there is an opening 17 through which opening the piston 12 freely can be displaced in maintaining a permanently open slot 18 between the edge section (i.e., outer diameter) of the piston 12 and that edge (i.e., inner diameter) defining the opening 17. If large amounts of flow are intended to pass through the regulator 1, the partition 16 can be provided with passages 19. A gauge 20 indicating the pressure in the upper chamber 14 communicates with the chamber 14 over a passage 21. The chamber 14 opens into a threaded outlet 22. Pressure medium is supplied to the lower chamber 15 through a threaded inlet 23 provided with a replaceable nozzle 24. In the lower chamber 15 a valve seat 25 cooperates with the regulating piston 12, said valve seat 25 is inserted into and by a packing ring 26 is sealed against a bore 27 in the bottom of the chamber 15. The valve seat 25 is formed as a sleeve having a flat upper edge and a flat lower edge 28 provided with a flange resting against an overflow conduit 29 which opens into the atmosphere. The conduit 29 is provided with a threaded portion 30 in order to retain the valve seat 25 having its flanged edge 28 resting against a shoulder 31 formed outside and around the bore 27. The overflow conduit 29 serves as an outlet 32 for overflow medium and for solid particles and defilements which enter the regulator 1. In facilitating the movement of the piston 5 an opening 33 is provided in the lower section of the cylinder 4 just above the flange 9, through which opening 33 the air enclosed in the cylinder 4 can communicate.

The pressure regulator according to the present invention functions as follows:

A medium, the pressure of which is desired to be controlled to a constant predetermined pressure is supplied through the inlet 23 and the nozzle 24. From the lower chamber 15 the medium flows up through the slot 18 and through the passages 19 (if any) to the upper chamber 14 and towards the pressure area (the backing plate 10) of the weight loaded movable piston 5 and lifts the latter from its lowest position, in which the regulating piston 12 seals the valve seat 25. When this happens, overflow medium flows out through the outlet 32 in the passage which is formed between the regulating piston 12 and the valve seat 25 as the piston 5 moves upwardly, whereby the pressure in the chambers 14 and 15 drops in dependence on the area conditions of the nozzle 24 and the variable overflow formed by the regulating piston 12 and the valve seat 25, until a balanced condition is obtained between the force from the medium pressure of the chamber 14 acting upwards and the weight load directed downwards. The controlled medium pressure is acting against the pressure area of the movable piston 5 and in order to maintain the balance the piston 5 will all the time "float" on the medium without any mechanical contact between the regulating elements 12, 25 of the variable throttle means, so that the risk that the variable throttle means may become jammed or that changes in the friction resulting in a following changement of the secondary pressure, are eliminated. The rolling diaphragm 8 and the Teflon bushing 6 minimize friction between the movable parts.

Figures 2, 3:
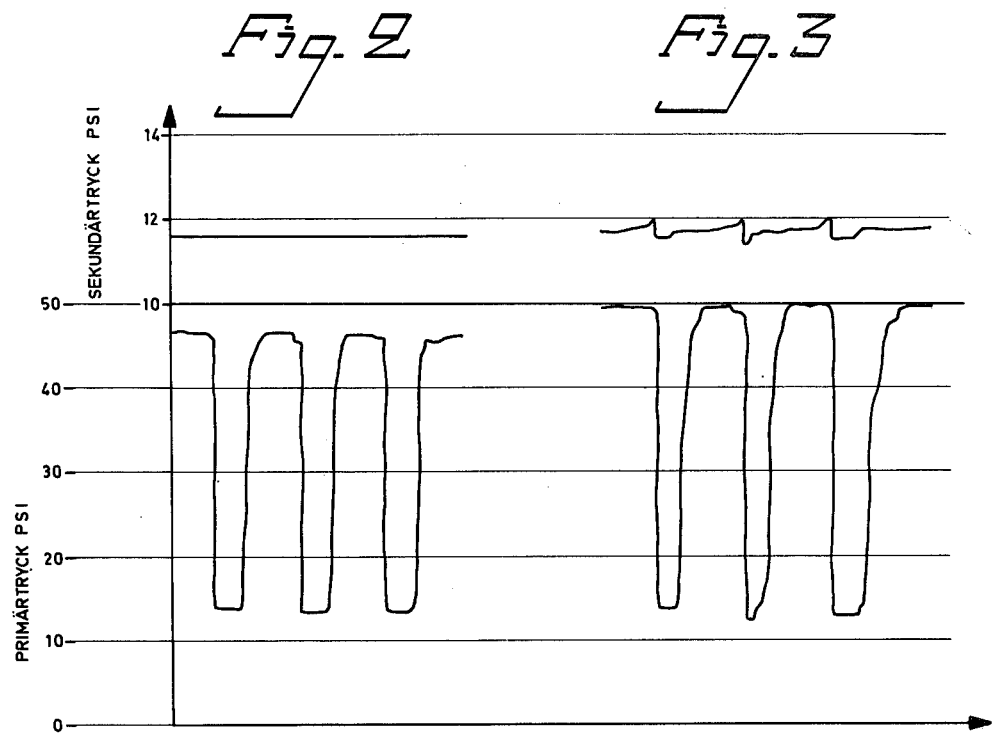
FIGS. 2–5 show by aid of a curve diagram the sensitivity of the regulator according to the invention in relation to a conventional pressure regulator.
Figures 4, 5:
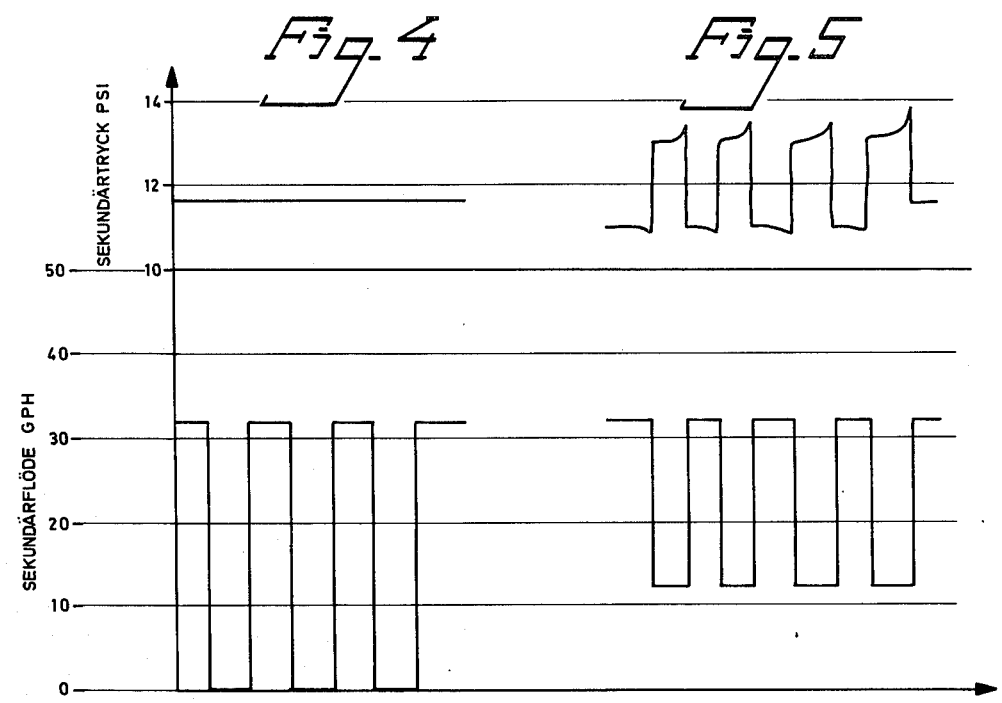

In FIGS. 2 to 5 the sensitivity to step changes in primary pressure, i.e., the pressure of the medium supplied to the regulator, is illustrated in FIGS. 2 and 3 and the sensitivity to step changes in secondary flow in FIGS. 4 and 5 by curve diagrams. FIGS. 2 and 4 present the curves of the regulator according to the present invention and FIGS. 3 and 5 present corresponding curves of a conventional pressure regulator. In changes of the primary pressure between approx. 15–50 PSI one obtains, as can be seen from FIG. 2, still a constant secondary pressure of this case 11.50 PSI while a conventional regulator as can be seen from FIG. 3 develops pressure variations of the secondary pressure of approx. 0.80 PSI from an average value. In changing of the output secondary flow with a value between 0–33 GPH one obtains as can be seen from FIG. 4 (the regulator according to the present invention) still a constant secondary pressure of in the example illustrated 11.60 PSI while the secondary pressure of a conventional regulator varies from 10.80 to 13.80 PSI in changing of the output secondary flow between 12–32 GPH.

The invention is not restricted to the embodiment described above and illustrated in the drawing, but this embodiment merely comprises an example of the invention and its applications.

What we claim is:

1. A pressure regulator comprising in combination:
a body having an inlet port (23) of predetermined flow area and an outlet port (22) and an overflow port (32);
said body having inlet (15) and outlet (14) chambers communicating respectively with said inlet and outlet ports;
a valve seat (25) in said valve body communicating with said overflow port;
a wall (17) in said body spaced from said valve seat and separating said chambers;
said wall having perforate means (18) permitting continuous flow from said inlet chamber to said outlet chamber;
valve head means (12) operative through said wall and movable to coact with said valve seat to effect flow throttling for variable closing of flow to said overflow port;
a movable weight bias means (5, 7) effecting a movable wall (8, 10) of one (14) said chamber and operatively connected to said valve head means and being exposed to pressure in said one chamber so as to be operated by pressure therein to variably adjust said valve head means relative said valve seat responsive to pressure in said one chamber;
wherein pressure overcoming said weight bias means is effective to operate said valve head means for coaction with said valve seat to permit excess flow to communicate with said overflow port (32) for dropping pressure by throttling effect dependent upon said predetermined inlet port area and the variable flow area effected by coaction of said valve head means with said valve seat.

2. A pressure regulator as set forth in claim 1 wherein said one chamber is the outlet chamber.

3. A pressure regulator as set forth in claim 1 wherein said predetermined flow area of said inlet port is effected by a selected nozzle fitted thereinto.

4. A pressure regulator as set forth in claim 1 wherein said perforate means in said wall comprises an aperture and said valve head means comprises a valve head reciprocal therethrough;
said aperture effecting a spacing around said valve head to permit said continuous flow from said inlet chamber to said outlet chamber.

5. A pressure regulator as set forth in claim 1 wherein said movable weight biasing means comprises a movable member directed axially toward said valve seat and being sealed to said body with a rolling diaphragm;
said valve head means comprising a valve head secured to said movable member in axial alignment with said valve seat;
wherein the cross-sectional area of said movable member and diaphragm in an axial direction is subjected to pressure in said one chamber;
said one chamber being said outlet chamber.

6. A pressure regulator as set forth in claim 1 wherein said one chamber is the outlet chamber and wherein said predetermined flow area of said inlet port is effected by a selected nozzle fitted thereinto.

7. A pressure regulator as set forth in claim 1 wherein said one chamber is the outlet chamber and wherein said perforate means in said wall comprises an aperture and said valve head means comprises a valve head reciprocal therethrough;
said aperture effecting a spacing around said valve head to permit said continuous flow from said inlet chamber to said outlet chamber.

8. A pressure regulator as set forth in claim 1 wherein said one chamber is the outlet chamber;
wherein said predetermined flow area of said inlet port is effected by a selected nozzle fitted thereinto; and
wherein said perforate means in said wall comprises an aperture and said valve head means comprises a valve head reciprocal therethrough;
said aperture effecting a spacing around said valve head to permit said continuous flow from said inlet chamber to said outlet chamber.

* * * * *